(12) United States Patent
Goto et al.

(10) Patent No.: US 6,310,663 B1
(45) Date of Patent: *Oct. 30, 2001

(54) INFORMATION PROCESSING APPARATUS HAVING PORTABLE SHAPE

(75) Inventors: Katsuichi Goto; Hideaki Kamikakai, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/969,660

(22) Filed: Nov. 13, 1997

(30) Foreign Application Priority Data

Nov. 22, 1996 (JP) .................................. 8-312339

(51) Int. Cl.[7] .................................. H04N 5/64
(52) U.S. Cl. .................. 348/838; 312/223.2; 361/683
(58) Field of Search .................. 348/838; 312/223.2, 312/223.1; 361/683, 679, 682, 724, 725; 364/708.1

(56) References Cited

U.S. PATENT DOCUMENTS

| | | | |
|---|---|---|---|
| 4,525,746 | * 6/1985 | Mangold et al. | 348/838 |
| 4,528,597 | * 7/1985 | Klein et al. | 348/838 |
| 4,742,478 | * 5/1988 | Nigro, Jr. et al. | 312/223.2 X |
| 5,052,078 | * 10/1991 | Hosoi | 348/838 X |
| 5,401,091 | * 3/1995 | Landry | 312/223.1 |
| 5,555,489 | * 9/1996 | Kaskinen | 312/223.2 X |
| 5,608,863 | * 3/1997 | Ishizawa et al. | 361/682 X |
| 5,657,258 | * 8/1997 | Grewe et al. | 364/708.1 |
| 5,677,711 | * 10/1997 | Kuo | 361/683 X |
| 5,754,397 | * 5/1998 | Howell et al. | 361/683 X |

FOREIGN PATENT DOCUMENTS

| | | |
|---|---|---|
| 60-174349 | 11/1985 | (JP) . |
| 3-90323 | 9/1991 | (JP) . |
| 4-35277 | 2/1992 | (JP) . |

OTHER PUBLICATIONS

*primaire*, Sanyo, Audio Classified Catalogue, Dec. 1991.

*PC Magazine*, The Independent Guide to Personal Computing, Jan. 23, 1996, vol. 15, No. 2, pp. 100–176.

*MOBILE PC*, May 1996, pp. 25–30 (with English Translation), pp. 25–30.

*MOBILE PC*, Jun. 1996, pp. 25–30 (with English translation), pp. 25–30.

*PC Magazine*, The Indedpendent Guide to Personal Computing, Aug. 1996, vol. 15, No. 14, pp. 100–195.

*MAC LIFE*, The Macintosh Life Style Magazine, Oct. 1996, No. 98, pp. 374–380.

English Translation (partial) of Japanese Reference No. 9–30323, already of record, a copy of which is also attached.

\* cited by examiner

*Primary Examiner*—Peter M. Cuomo
*Assistant Examiner*—Hanh V. Tran
(74) *Attorney, Agent, or Firm*—Staas & Halsey LLP

(57) ABSTRACT

An information processing apparatus includes a main body having an upper surface, and a display part which opens and closes with respect to the main body. The display part in a closed state is stacked on the upper surface of the main body and forms a generally flat parallelepiped shape together with the main body. The parallelepiped shape has a top surface, a bottom surface, and side surfaces forming an outer periphery of the parallelepiped shape. The main body has a first sloping surface joining the bottom surface and at least one of the side surfaces.

12 Claims, 11 Drawing Sheets

INFORMATION PROCESSING APPARATUS HAVING PORTABLE SHAPE

BACKGROUND OF THE INVENTION

The present invention generally relates to information processing apparatuses, and more particularly to an information processing apparatus having a portable shape.

Information processing apparatuses typified by lap-top computers and portable word processors have become more affordable and popular in recent years. With respect to such portable information processing apparatuses, there are demands to improve their portability so that the user can easily carry the information processing apparatus in a bag or the like. To meet such demands, various proposals have been made to reduce the overall size, thickness and weight of the portable information processing apparatus.

As conventional methods of reducing the overall size, thickness and weight of the portable information processing apparatus, there are a method which reduces the thickness and weight by employing a liquid crystal display, a method which reduces the overall size and weight by employing electronic parts having a low power consumption, a method which reduces the overall size and thickness by minimizing clearances between internal units of the portable information processing apparatus, a method which reduces the thickness and weight by employing a resin casing or cover having a reduced basic thickness, and the like.

However, at the present, a considerable progress in the above described methods cannot be expected for the following reasons.

First, the overall size and thickness of parts forming the portable information processing apparatus have already been reduced to nearly the technical limit, and a new technique which would enable further reduction in the overall size and thickness of the parts is unlikely to be developed in the near future.

Second, even if a technique is developed to further reduce the overall size and thickness of the parts forming the portable information processing apparatus, the portable information processing apparatus would only become more difficult for the user to operate if the overall size and thickness of the portable information processing apparatus are further reduced considerably. For example, an excessively reduced keyboard would only make it more difficult for the user to operate keys of the keyboard, and an excessively reduced display would only make it more difficult for the user to see displayed information on the display.

Third, if the basic thickness of the resin casing or cover is further reduced in order to further reduce the thickness of the portable information processing apparatus, the strength and rigidity of the casing or cover deteriorate. As a result, the casing or cover with the further reduced thickness would easily break, thereby deteriorating the reliability of the portable information processing apparatus. In the case of the portable information processing apparatus, the chances of the portable information processing apparatus receiving an external shock is not small since the portable information processing apparatus is often carried by the user, and for this reason, it is desirable that the casing or cover has certain strength and rigidity so that the portable information processing apparatus will uneasily be damaged by external shock.

FIG. 1 is a front view generally showing an example of a conventional information processing apparatus set up on a base. In FIG. 1, an information processing apparatus 41 is set up on a base 42 such as a desk. The information processing apparatus 41 has a generally flat parallelepiped shape. When the user wishes to carry the information processing apparatus 41 in a bag or the like, the user may have difficulty accommodating the information processing apparatus 41 in the bag by one hand particularly when documents or the like are already accommodated within the bag.

FIG. 2 is a cross sectional view for explaining accommodation of the information processing apparatus 41 into a bag 44 which already accommodates documents 43. In the case shown in FIG. 2, the side surface of the information processing apparatus 41 will hit the documents 43 within the bag 44 if an attempt is made to accommodate the information processing apparatus 41 in the bag 44. More particularly, since a corner portion 45 where the side and bottom surfaces of the information processing apparatus 41 meet and a corner portion 46 where the side and top surfaces of the information processing apparatus 41 meet are sharp, these corner portions 45 and 46 will hit the documents 43 when the user tries to put the information processing apparatus 41 into the bag 44. For this reason, the user must first move the documents 43 or the like already accommodated within the bag 44 so as to form a space which would enable accommodation of the information processing apparatus 41 within the bag 44, before actually inserting the information processing apparatus 41 into the bag 44. However, it is extremely difficult for the user to move the documents 43 or the like within the bag 44 and to then insert the information processing apparatus 41 into the bag 44 using only one hand.

On the other hand, when the user wishes to lift the information processing apparatus 41 which is set up on the base 42 as shown in FIG. 1, the user must insert his fingers between the base 42 and the information processing apparatus 41. However, since the side and bottom surfaces of the information processing apparatus 41 are flat and right angles to each other, there is no space between the information processing apparatus 41 and the base 42 for receiving the user's finger tips, and it is extremely difficult for the user to lift the information processing apparatus 41 from the base 42, particularly when using only one hand.

SUMMARY OF THE INVENTION

Accordingly, it is a general object of the present invention to provide a novel and useful information processing apparatus in which the problems described above are eliminated and the demands described above are satisfied.

Another and more specific object of the present invention is to provide an information processing apparatus which has a shape that improves portability of the information processing apparatus.

Still another object of the present invention is to provide an information processing apparatus comprising a main body having an upper surface, and a display part which opens and closes with respect to the main body, where the display part in a closed state is stacked on the upper surface of the main body and forms a generally flat parallelepiped shape together with the main body, the parallelepiped shape has a top surface, a bottom surface, and side surfaces forming an outer periphery of the parallelepiped shape, and the main body has a first sloping surface joining the bottom surface and at least one of the side surfaces. According to the information processing apparatus of the present invention, it is possible to improve both the portability of the information processing apparatus and the thin appearance of the information processing apparatus such that the apparent thickness of the information processing apparatus will look smaller than the actual thickness of the information processing apparatus.

A further object of the present invention is to provide the information processing apparatus of the type described above, and wherein a vertical height of the first sloping surface taken from the bottom surface to a position where the first sloping surface and the side surface meet is greater than ¼ a vertical distance between the bottom surface and the top surface and less than a vertical distance between the bottom surface and the upper surface of the main body. According to the information processing apparatus of the present invention, it is possible to improve both the portability of the information processing apparatus and particularly the thin appearance of the information processing apparatus such that the apparent thickness of the information processing apparatus will look smaller than the actual thickness of the information processing apparatus.

Another object of the present invention is to provide the information processing apparatus of the type described above, wherein the display part has a second sloping surface joining the top surface and at least one of the side surfaces, and a vertical height of the second sloping surface taken from the top surface to a position where the second sloping surface and the side surface meet is greater than ⅛ a vertical distance between the top surface and the bottom surface and less than a vertical distance between the top surface and the upper surface of the main body. According to the information processing apparatus of the present invention, it is possible to further improve both the portability of the information processing apparatus and the thin appearance of the information processing apparatus such that the apparent thickness of the information processing apparatus will look much smaller than the actual thickness of the information processing apparatus.

Other objects and further features of the present invention will be apparent from the following detailed description when read in conjunction with the accompanying drawings.

DESCRIPTION OF THE PREFERRED EMBODIMENTS

Figure 3:
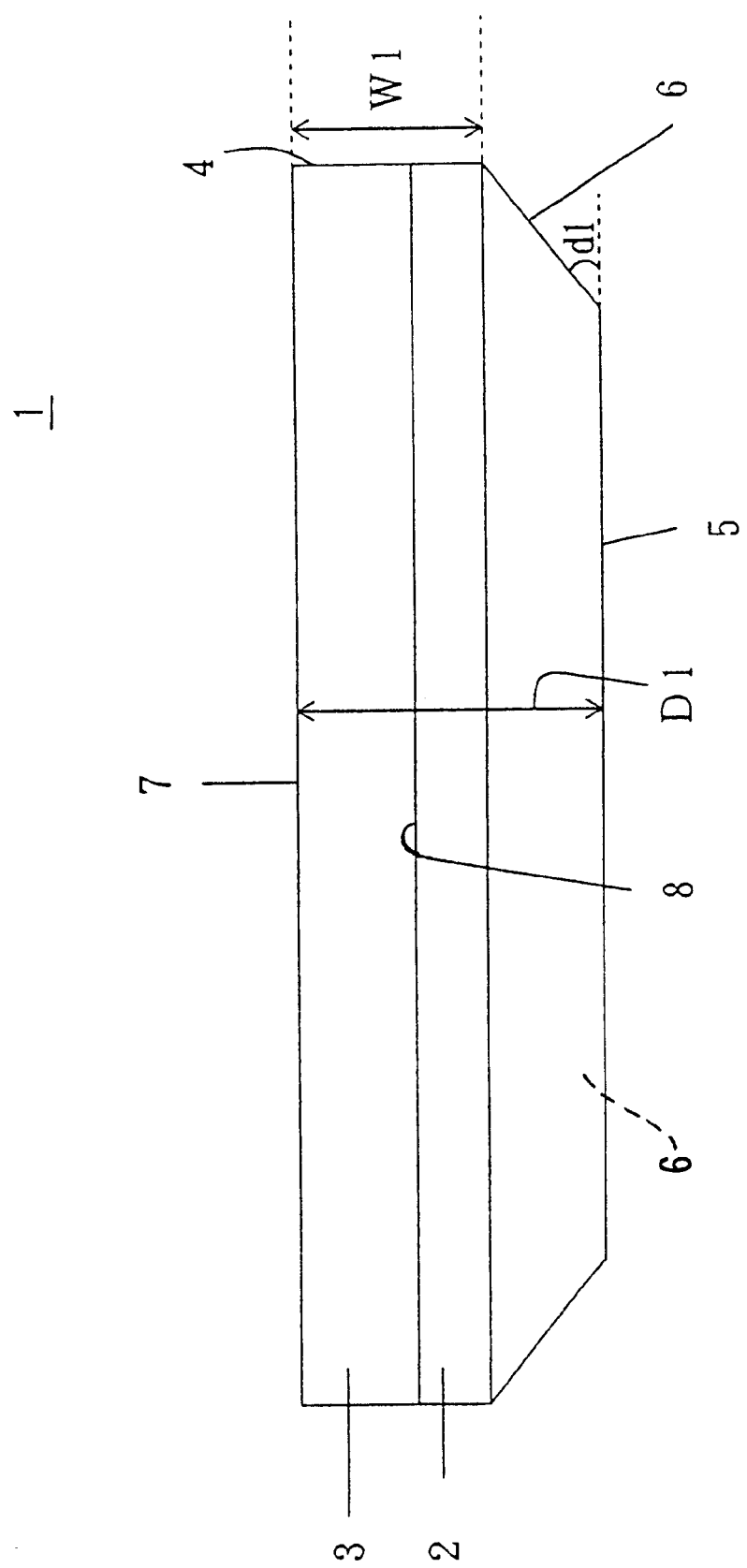
FIG. 3 is a front view generally showing a first embodiment of an information processing apparatus according to the present invention.

First, a description will be given of a first embodiment of an information processing apparatus according to the present invention. FIG. 3 is a front view generally showing the first embodiment of the information processing apparatus. In FIG. 3, only the characterizing external features are shown, and the illustration of the details of the information processing apparatus are omitted. In this embodiment, the present invention is applied to a portable lap-top computer.

An information processing apparatus 1 shown in FIG. 3 generally includes a main body 2, and a display part 3 which can open and close with respect to the main body 2 about a hinge provided at a rear part of the main body 2. FIG. 3 shows the display part 3 in a closed state, and FIG. 4 which will be described later shows the display part 3 in an open state.

Side surfaces 4 of the information processing apparatus 1 have a width W1 which is smaller than a thickness D1 of the information processing apparatus 1. The thickness D1 is the distance between a bottom surface 5 and a top surface 7 of the information processing apparatus 1. The bottom surface 5 of the information processing apparatus 1 has an area smaller than an area which is surrounded by the four side surfaces 4. A lower end of the side surface 4 and an end of the bottom surface 5 are joined by a sloping surface 6.

An angle d1 which is formed between a horizontal extension of the bottom surface 5 and the sloping surface 6 is set within a range of approximately 30° to 60°, so that the shape of the information processing apparatus 1 facilitates carrying of the information processing apparatus 1. In order to prevent excessive reduction of the internal volume of the main body 2, it is desirable that the angle d1 is set to approximately 45°.

In addition, in order to facilitate carrying of the information processing apparatus 1, it is desirable that an upper end of the sloping surface 6, that is, a vertical height of the sloping surface 6, is higher than ¼ the thickness D1 taken from the bottom surface 5, and is lower than a corner portion where the side surface 4 and an upper surface 8 of the main body 2 meet.

It is also desirable that the sloping surface 6 is provided along the four side surfaces 4 from the point of view of facilitating carrying of the information processing apparatus 1. When the sloping surface 6 is provided along the four side surfaces 4, the sloping surface 6 may exist continuously for the entire outer periphery of the information processing apparatus 1 or, at least one discontinuity such as a cutout may exist along the outer periphery of the information processing apparatus 1. In other words, the sloping surface 6 is desirably provided generally along the outer periphery of the information processing apparatus 1.

If it is difficult to reduce the internal volume of the main body 2 due to units and parts to be accommodated within the main body 2, it is possible to provide the sloping surface 6 at only a portion along the outer periphery of the information processing apparatus. In this case, it is desirable that the sloping surface 6 is provided at a portion including at least one corner portion of the information processing apparatus 1 joining the bottom surface 5.

From the point of view of making the appearance of the information processing apparatus 1 thin so as to emphasize the thin shape of the information processing apparatus 1 to the user, it is desirable to provide the sloping surface 6 at the front surface of the information processing apparatus 1. By providing the sloping surface 6 at the front surface of the information processing apparatus 1, the user cannot see an edge of the bottom surface 5 in the perspective view, that is, by a normal viewing angle from above the information processing apparatus 1, and the information processing apparatus 1 will appear to the user as if the thickness of the information processing apparatus 1 is only the thickness (width W1) of the side surface 4. As a result, the thickness of the information processing apparatus 1 will appear extremely small in this case.

Figure 4:
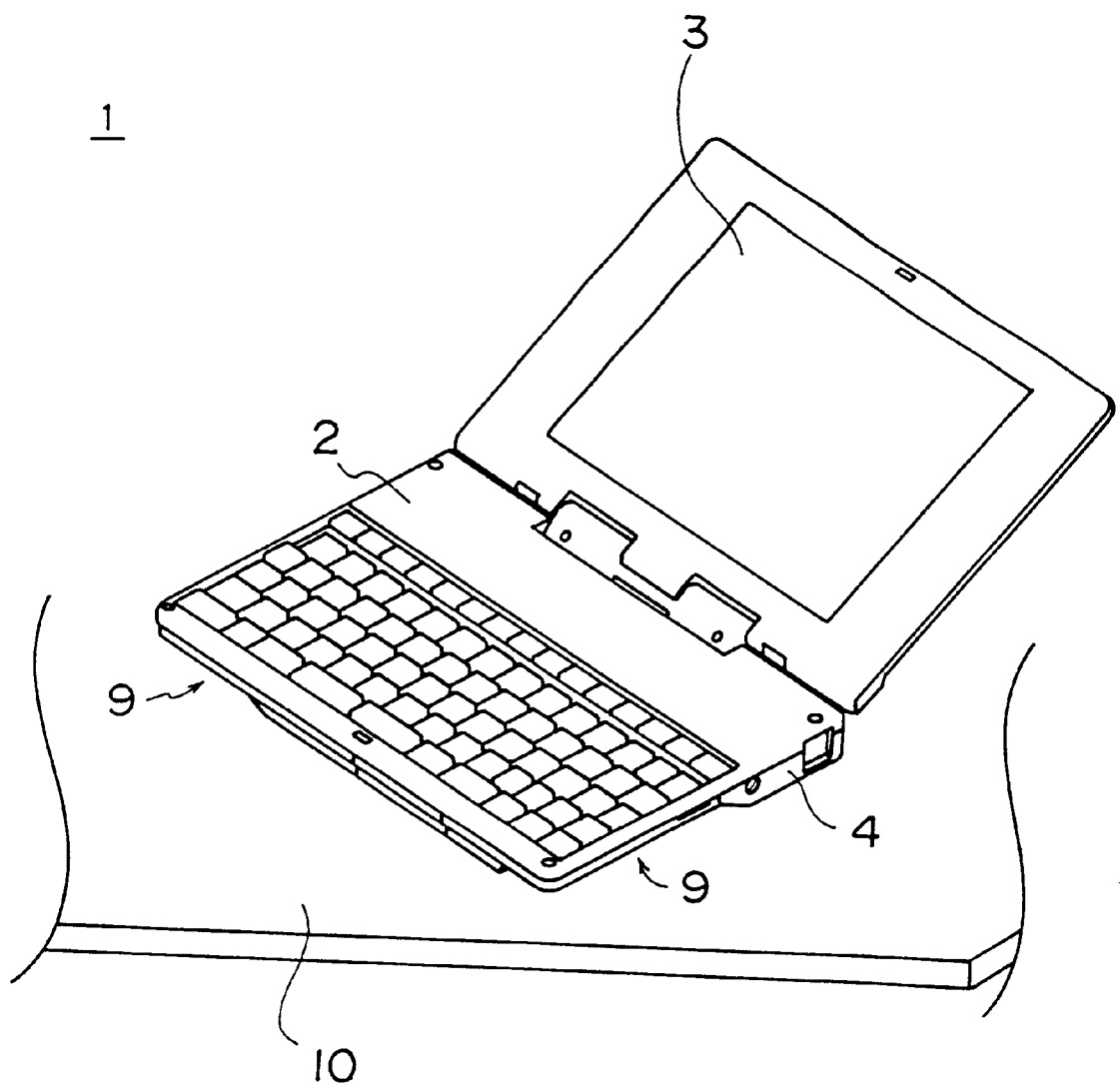
FIG. 4 is a perspective view showing the first embodiment of the information processing apparatus set up on a base.

Next, a more detailed description will be given of the external appearance of the first embodiment of the information processing apparatus, by referring to FIG. 4 and FIGS. 5A through 5F. FIG. 4 is a perspective view showing the first embodiment of the information processing apparatus set up on a base. FIGS. 5A, 5B, 5C, 5D, 5E and 5F respectively are a plan view, a left side view, a right side view, a front view, a rear view and a bottom view showing the first embodiment of the information processing apparatus in more detail.

In FIG. 4, the information processing apparatus 1 is set up on a base 10 such as a desk, in a state where the display part 3 is opened with respect to the main body 2. The display part 3 is in this open state when the user operates the information processing apparatus 1. On the other hand, the display part 3 is normally in the closed state shown in FIG. 3 and FIGS. 5A through 5F when the user carries the information processing apparatus 1.

Figure 1:
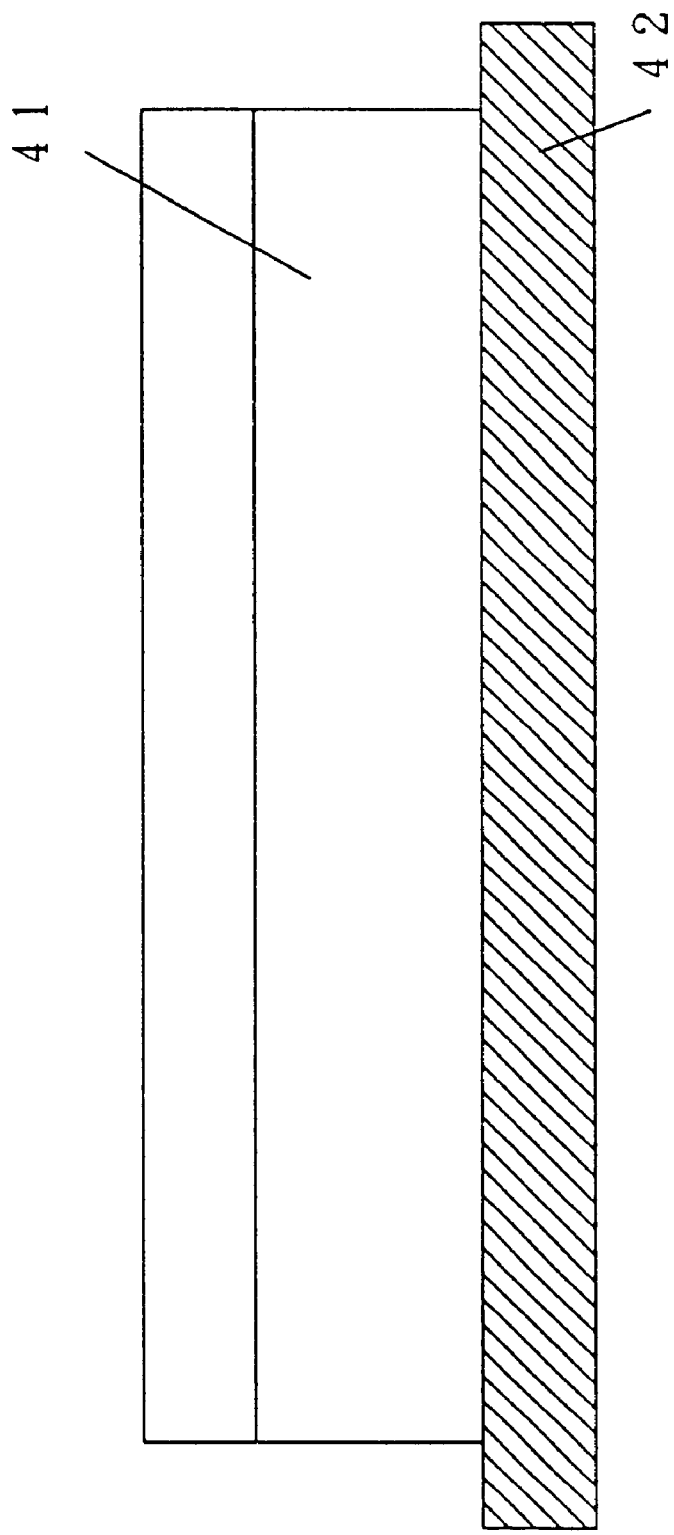
FIG. 1 is a front view generally showing an example of a conventional information processing apparatus set up on a base.
Figure 2:
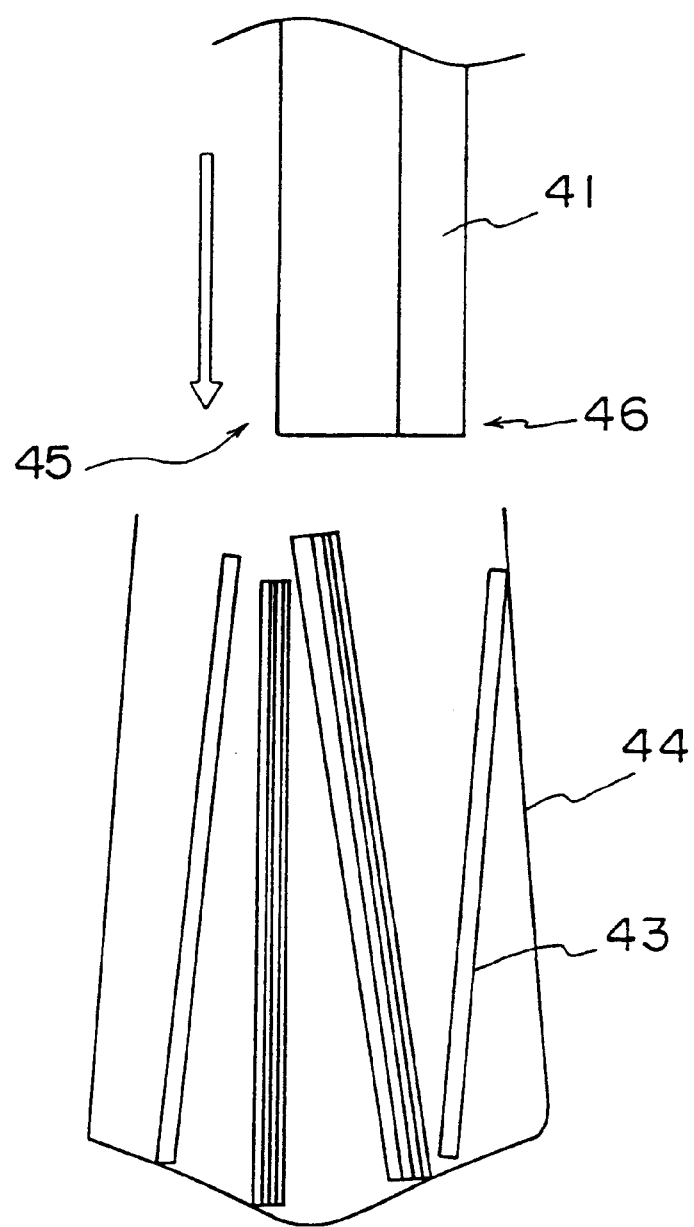
FIG. 2 is a cross sectional view for explaining accommodation of the conventional information processing apparatus into a bag.
Figure 5A:
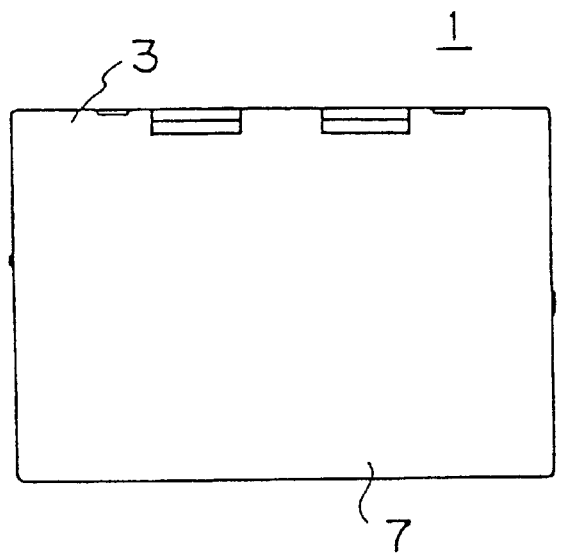
FIGS. 5A, 5B, 5C, 5D, 5E and 5F respectively are a plan view, a left side view, a right side view, a front view, a rear view and a bottom view showing the first embodiment of the information processing apparatus in more detail.
Figure 5B:
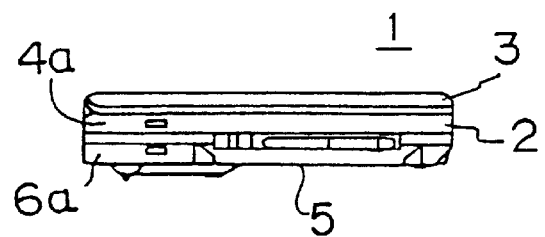
Figure 5C:
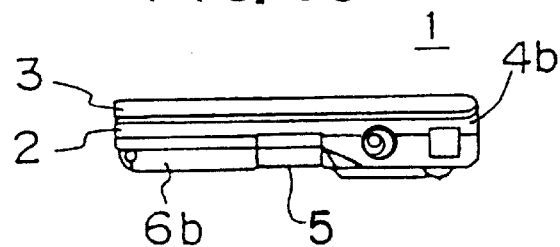
Figure 5D:
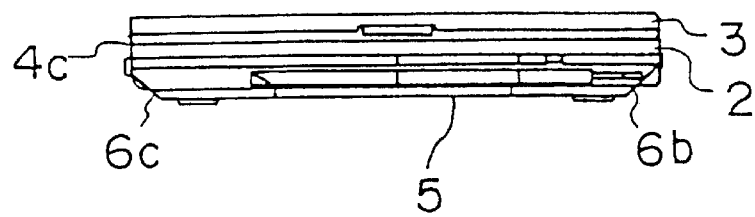
Figure 5E:
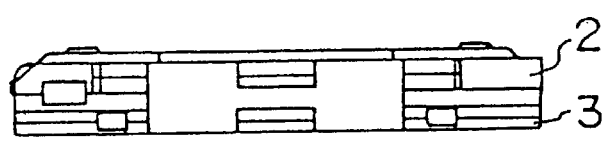
Figure 5F:
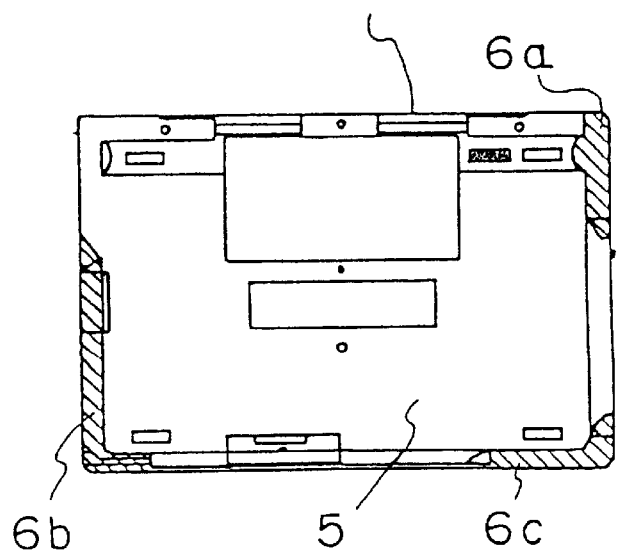

As may be seen from FIGS. 5B, 5C and 5D, it is assumed in FIGS. 4 and FIGS. 5A through 5F for the sake of convenience that a sloping surface 6a is provided between a left side surface 4a and the bottom surface 5, a sloping surface 6b is provided between a right side surface 4b and the bottom surface 5, and a sloping surface 6c is provided between a front surface 4c and the bottom surface 5. The sloping surfaces 6a, 6b and 6c are indicated by hatching in FIG. 5F. In other words, the sloping surface 6 is not provided continuously along the entire outer periphery of the information processing apparatus 1. Hence, a sharp corner portion formed by the side and bottom surfaces of the conventional information processing apparatus 41 shown in FIGS. 1 and 2 described above is eliminated at the portions of the information processing apparatus 1 where the sloping surfaces 6a, 6b and 6c are provided.

Figure 6:
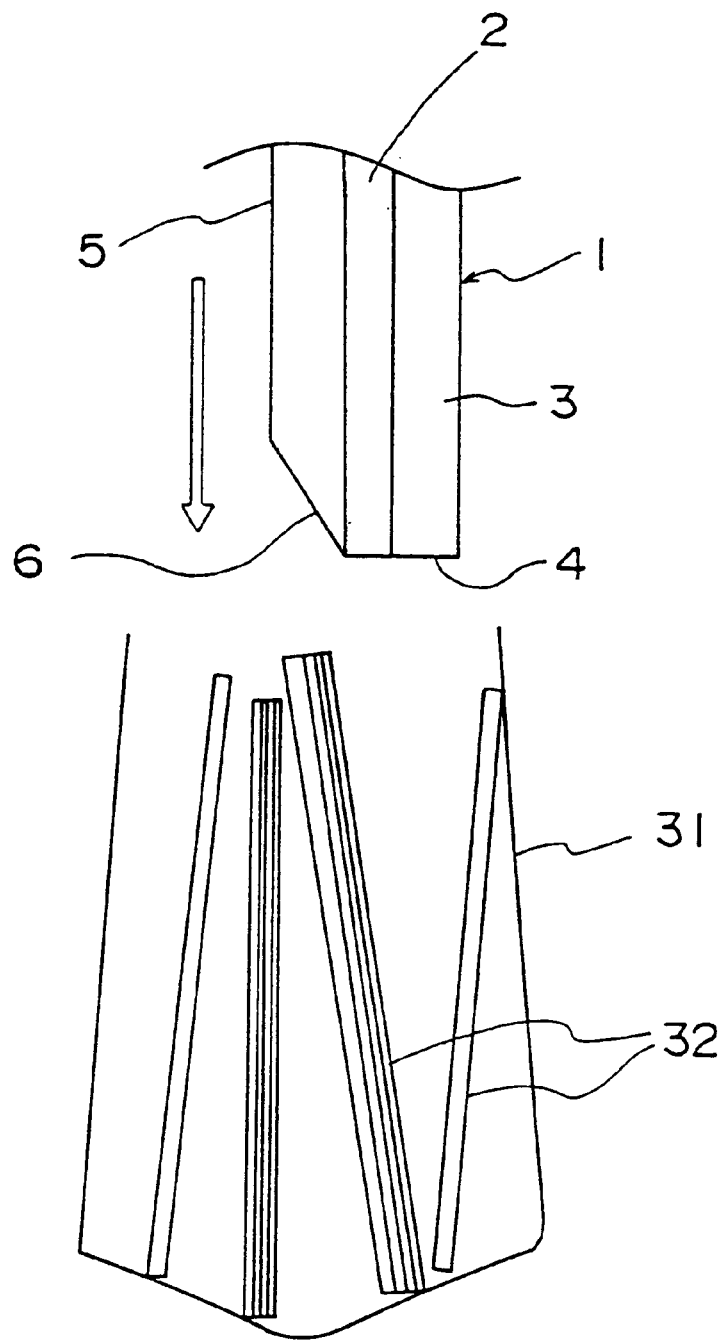
FIG. 6 is a cross sectional view for explaining accommodation of the first embodiment of the information processing apparatus into a bag.

FIG. 6 is a cross sectional view for explaining accommodation of the information processing apparatus 1 into a bag 31 which already accommodates documents 32.

In the case shown in FIG. 6, the possibility of the side surface 4 of the information processing apparatus 1 hitting the documents 32 within the bag 31 and preventing the accommodation of the information processing apparatus 1 when an attempt is made to accommodate the information processing apparatus 1 in the bag 31 is small, because of the provision of the sloping surface 6 (6a, 6b or 6c). More particularly, since a corner portion where the side surface 4a or 4b or the front surface 4c and the bottom surface 5 of the information processing apparatus 1 meet is tapered by the provision of the sloping surface 6 (6a, 6b or 6c), the corner portion will unlikely be blocked by the documents 32 when the user tries to put the information processing apparatus 1 into the bag 31. As a result, the sloping surface 6 and the documents 32 will guide each other, and the information processing apparatus 1 will be guided smoothly into the bag 31 between the documents 32.

For this reason, unlike the conventional case described above in conjunction with FIG. 2, there is no need for the user to first move the documents 32 or the like already accommodated within the bag 31 so as to form a space which would enable accommodation of the information processing apparatus 1 within the bag 31 before actually inserting the information processing apparatus 1 into the bag 31. Therefore, it is possible for the user to easily and smoothly insert the information processing apparatus 1 into the bag 31 using only one hand even if the documents 32 are already accommodated within the bag 31.

On the other hand, when the user wishes to lift the information processing apparatus 1 which is set up on the base 10 as shown in FIG. 4, the user can easily insert his fingers within a gap 9 formed between the base 10 and the information processing apparatus 1 and positively get hold of the information processing apparatus 1. Hence, it is extremely easy for the user to lift the information processing apparatus 1 from the base 10, even by use of only one hand.

In addition, as may be seen from FIG. 4, the user cannot see an edge of the bottom surface 5 for a large range of the outer periphery of the information processing apparatus 1 in the perspective view, that is, by a normal viewing angle from above the information processing apparatus 1, when the sloping surface 6 is provided. Consequently, the information processing apparatus 1 will appear to the user as if the thickness of the information processing apparatus 1 is smaller than the actual thickness, thereby making it possible to emphasize the thin shape of the information processing apparatus 1 to the user.

Therefore, the provision of the sloping surface 6 improves both the portability of the information processing apparatus 1 and the thin appearance of the information processing apparatus 1.

Figure 7:
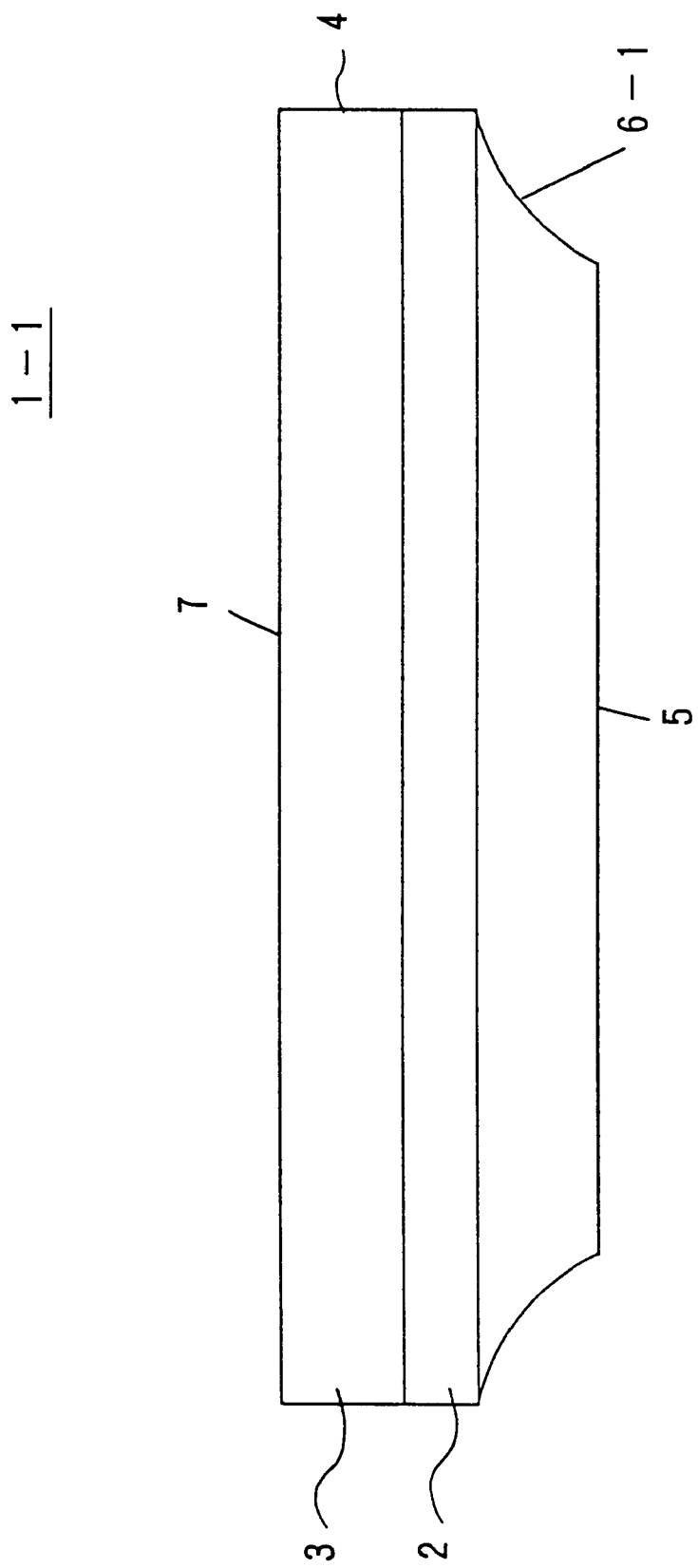
FIG. 7 is a front view generally showing a first modification of the first embodiment of the information processing apparatus.

Next, a description will be given of a first modification of the first embodiment, by referring to FIG. 7. FIG. 7 is a front view generally showing the first modification of the first embodiment of the information processing apparatus. In FIG. 7, those parts which are the same as those corresponding parts in FIG. 3 are designated by the same reference numerals, and a description thereof will be omitted.

In an information processing apparatus 1-1 shown in FIG. 7, a sloping surface 6-1 is provided continuously or, with at least one discontinuity, along the entire outer periphery of the information processing apparatus 1-1. This sloping surface 6-1 is curved inwards and has a concave shape as opposed to a linear shape of the sloping surface 6 described above. For this reason, it is particularly easy for the user to positively hold and lift the information processing apparatus 1-1 from the base 10 by inserting his fingers into the gap 9 between the base 10 and the bottom surface 5 of the information processing apparatus 1-1.

Figure 8:
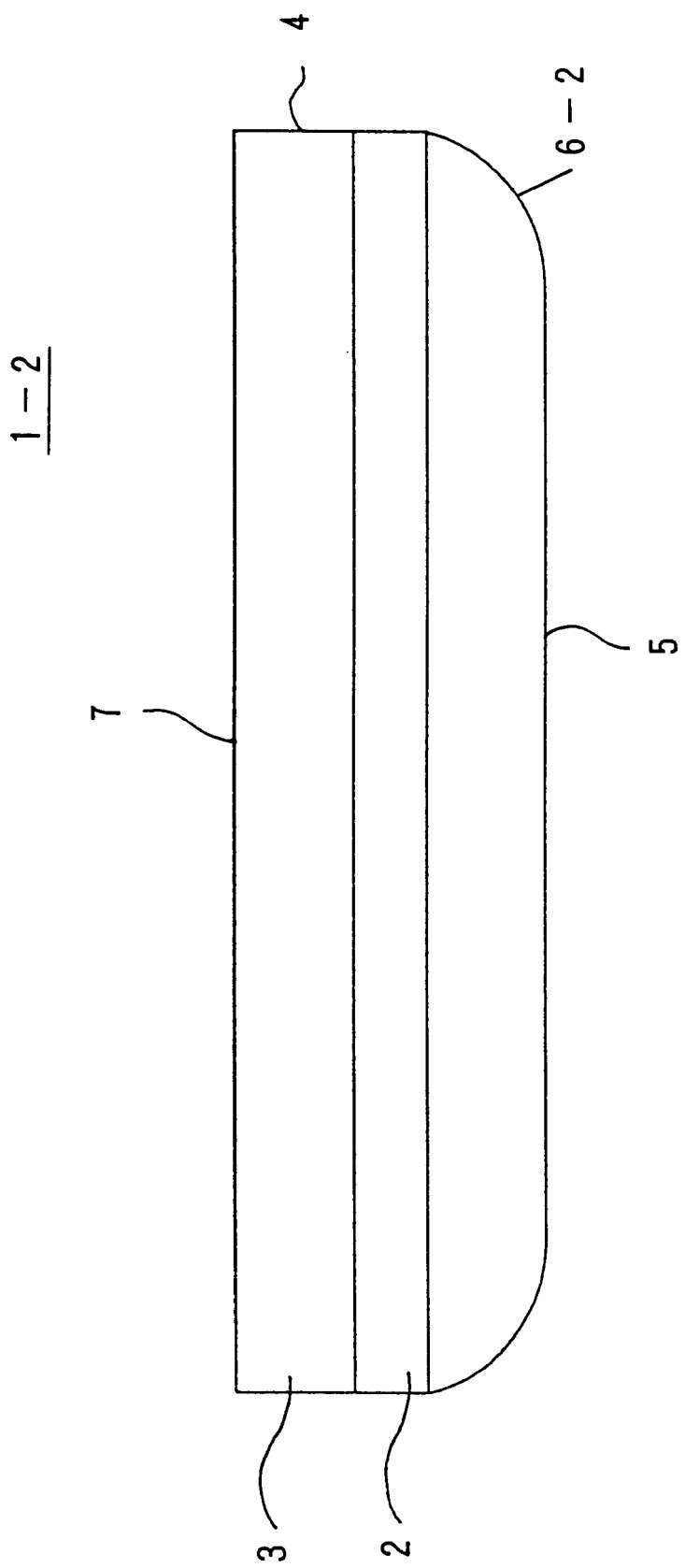
FIG. 8 is a front view generally showing a second modification of the first embodiment of the information processing apparatus.

Next, a description will be given of a second modification of the first embodiment, by referring to FIG. 8. FIG. 8 is a front view generally showing the second modification of the first embodiment of the information processing apparatus. In FIG. 8, those parts which are the same as those corresponding parts in FIG. 3 are designated by the same reference numerals, and a description thereof will be omitted.

In an information processing apparatus 1-2 shown in FIG. 8, a sloping surface 6-2 is provided continuously or, with at least one discontinuity, along the entire outer periphery of the information processing apparatus 1-2. This sloping surface 6-2 is curved outwards and has a convex shape. For this reason, it is particularly easy for the user to insert the information processing apparatus 1-2 into the bag 31 since the convex shape of the sloping surface 6-2 will realize an extremely small contact area between the sloping surface and the documents 32 within the bag 31. Furthermore, the convex shape of the sloping surface 6-2 minimizes the reduction in the internal volume of the main body 2, thereby securing a sufficient space within the main body 2 for mounting units and parts of the information processing apparatus 1-2.

Of course, the first embodiment and the first and second modifications thereof may be similarly applied to information processing apparatuses other than the lap-top computer, such as a portable word processor.

Figure 9:
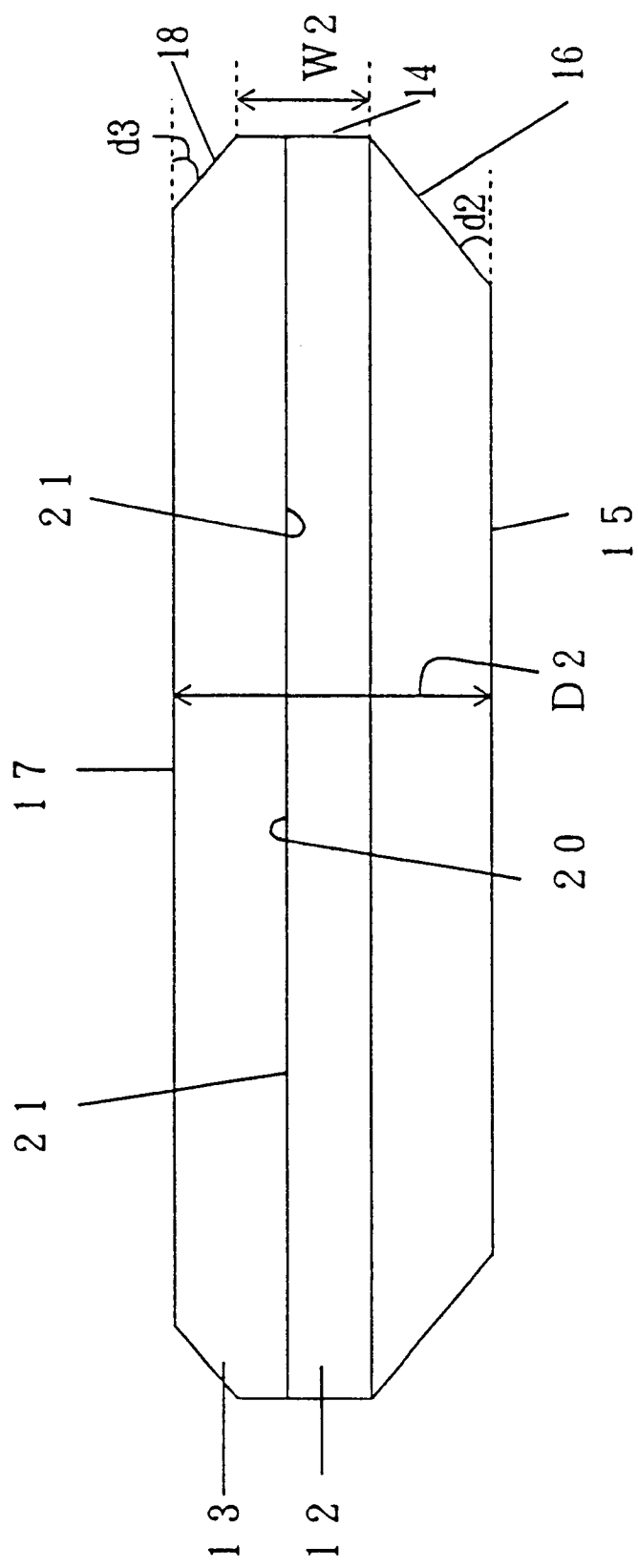
FIG. 9 is a front view generally showing a second embodiment of the information processing apparatus according to the present invention.

Next, a description will be given of a second embodiment of the information processing apparatus according to the present invention, by referring to FIG. 9. FIG. 9 is a front view generally showing the second embodiment of the information processing apparatus according to the present invention. In FIG. 9, only the characterizing external features are shown, and the illustration of the details of the information processing apparatus are omitted. In this embodiment, the present invention is applied to a portable word processor.

An information processing apparatus 11 shown in FIG. 9 generally includes a main body 12, and a display part 13 which can open and close with respect to the main body 12 about a hinge provided at a rear part of the main body 12. FIG. 9 shows the display part 13 in a closed state, but the display part 13 is opened similarly to the first embodiment shown in FIG. 4 described above.

Side surfaces 14 of the information processing apparatus 11 have a width W2 which is smaller than a thickness D2 of the information processing apparatus 11. The thickness D2 is the distance between a bottom surface 15 and a top surface 17 of the information processing apparatus 11. The bottom surface 15 of the information processing apparatus 11 has an area smaller than an area which is surrounded by the four side surfaces 14. A lower end of the side surface 14 and an end of the bottom surface 15 are joined by a sloping surface 16.

An angle d2 which is formed between a horizontal extension of the bottom surface 15 and the sloping surface 16 is set within a range of approximately 30° to 60°, so that the shape of the information processing apparatus 11 facilitates carrying of the information processing apparatus 11. In order to prevent excessive reduction of the internal volume of the main body 12, it is desirable that the angle d2 is set to approximately 45°.

In addition, in order to facilitate carrying of the information processing apparatus 11, it is desirable that an upper end of the sloping surface 16, that is, a vertical height of the sloping surface 16, is higher than ¼ the thickness D2 taken from the bottom surface 15, and is lower than a corner portion where the side surface 14 and an upper surface 20 of the main body 12 meet.

It is also desirable that the sloping surface 16 is provided along the four side surfaces 14 from the point of view of facilitating carrying of the information processing apparatus 11. When the sloping surface 16 is provided along the four side surfaces 14, the sloping surface 16 may exist continuously for the entire outer periphery of the information processing apparatus 11 or, at least one discontinuity such as a cutout may exist along the outer periphery of the information processing apparatus 11. In other words, the sloping surface 16 is desirably provided generally along the outer periphery of the information processing apparatus 11.

If it is difficult to reduce the internal volume of the main body 12 due to units and parts to be accommodated within the main body 12, it is possible to provide the sloping surface 16 at only a portion along the outer periphery of the information processing apparatus. In this case, it is desirable that the sloping surface 16 is provided at a portion including at least one corner portion of the information processing apparatus 11 joining the bottom surface 15.

From the point of view of making the appearance of the information processing apparatus 11 thin so as to emphasize the thin shape of the information processing apparatus 11 to the user, it is desirable to provide the sloping surface 16 at the front surface of the information processing apparatus 11. By providing the sloping surface 16 at the front surface of the information processing apparatus 11, the user cannot see an edge of the bottom surface 15 in the perspective view, that is, by a normal viewing angle from above the information processing apparatus 11, and the information processing apparatus 11 will appear to the user as if the thickness of the information processing apparatus 11 is only the thickness (width W2) of the side surface 14. As a result, the thickness of the information processing apparatus 11 will appear extremely small in this case.

In addition, the top surface 17 of the information processing apparatus 11 has an area smaller than the area which is surrounded by the four side surfaces 14. An upper end of the side surface 14 and an end of the top surface 17 are joined by a sloping surface 18.

An angle d3 which is formed between a horizontal extension of the top surface 17 and the sloping surface 18 is set within a range of approximately 30° to 60°, so that the shape of the information processing apparatus 11 facilitates carrying of the information processing apparatus 11. In order to prevent excessive reduction of the internal volume of the display part 13, it is desirable that the angle d3 is set to approximately 45°.

In addition, in order to facilitate carrying of the information processing apparatus 11, it is desirable that a distance between the top surface 17 and a lower end of the sloping surface 18, that is, a vertical height of the sloping surface 18, is greater than ⅛ the thickness D2 taken from the top surface 17, and is lower than a corner portion where the side surface 14 and a lower surface 21 of the display part 13 (or the upper surface of the main body 12) meet.

It is also desirable that the sloping surface 18 is provided along the four side surfaces 14 from the point of view of facilitating carrying of the information processing apparatus 11. When the sloping surface 18 is provided along the four side surfaces 14, the sloping surface 18 may exist continuously for the entire outer periphery of the information processing apparatus 11 or, at least one discontinuity such as a cutout may exist along the outer periphery of the information processing apparatus 11. In other words, the sloping surface 18 is desirably provided generally along the outer periphery of the information processing apparatus 11.

If it is difficult to reduce the internal volume of the display part 13 due to units and parts to be accommodated within the display part 13, it is possible to provide the sloping surface 18 at only a portion along the outer periphery of the information processing apparatus. In this case, it is desirable that the sloping surface 18 is provided at a portion including at least one corner portion of the information processing apparatus 11 joining the top surface 17.

From the point of view of making the appearance of the information processing apparatus 11 thin so as to emphasize the thin shape of the information processing apparatus 11 to the user, it is desirable to provide the sloping surface 18 at the front surface of the information processing apparatus 11. By providing the sloping surface 18 at the front surface of the information processing apparatus 11, the apparent thickness of the information processing apparatus 11 will appear as if it is only the thickness (width W2) of the side surface 14. As a result, the thickness of the information processing apparatus 11 will appear extremely small in this case.

Figure 10:
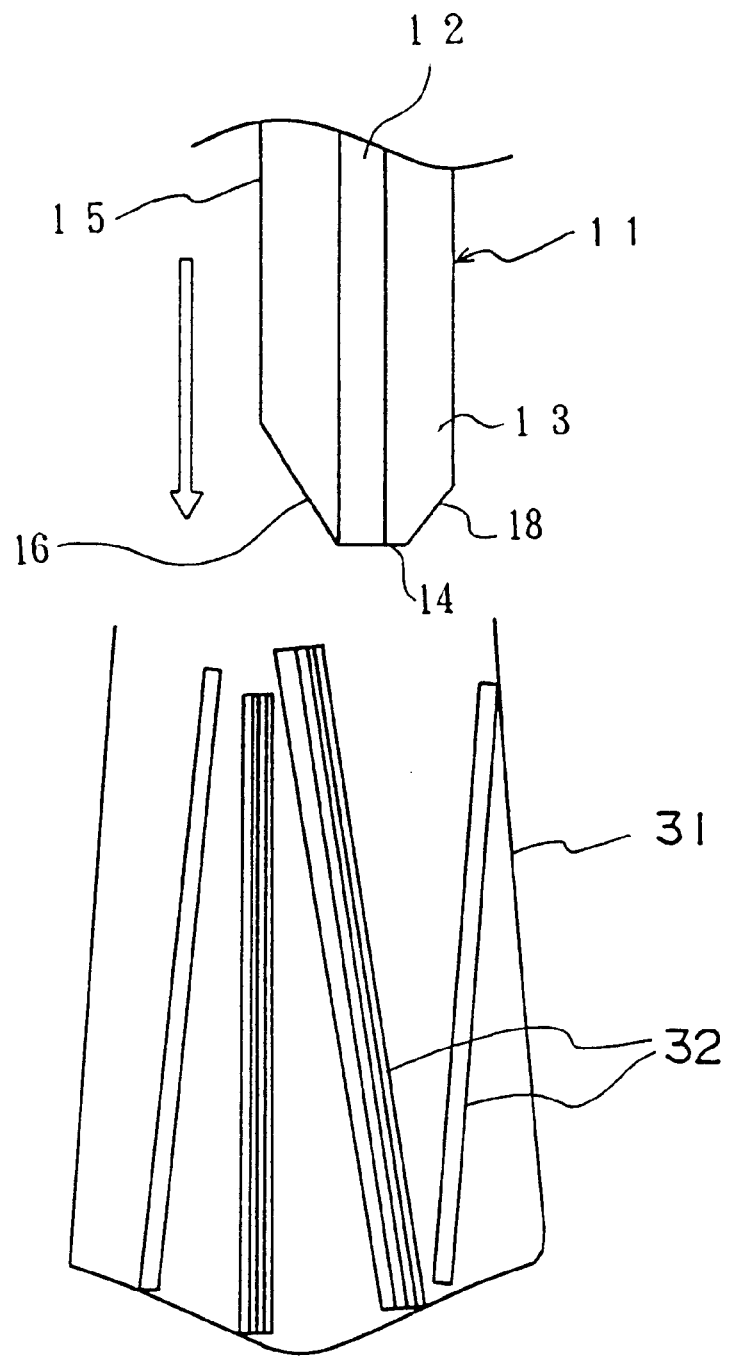
FIG. 10 is a cross sectional view for explaining accommodation of the second embodiment of the information processing apparatus into a bag.

FIG. 10 is a cross sectional view for explaining accommodation of the information processing apparatus 11 into a bag 31 which already accommodates documents 32. In FIG. 10, those parts which are the same as those corresponding parts in FIGS. 6 and 9 are designated by the same reference numerals, and a description thereof will be omitted.

In the case shown in FIG. 10, the possibility of the side surface 14 of the information processing apparatus 11 hitting the documents 32 within the bag 31 and preventing the accommodation of the information processing apparatus 11 when an attempt is made to accommodate the information processing apparatus 11 in the bag 31 is small, because of the provision of the sloping surfaces 16 and 18. More particularly, since a corner portion where the side surface 14 and the bottom surface 15 meet and a corner portion where the side surface 14 and the top surface 17 meet are tapered by the provision of the sloping surfaces 16 and 18, the corner portions will very unlikely be blocked by the documents 32 when the user tries to put the information processing apparatus 11 into the bag 31. As a result, the sloping surfaces 16 and 18 and the documents 32 will guide each other, and the information processing apparatus 11 will be guided very smoothly into the bag 31 between the documents 32.

For this reason, unlike the conventional case described above in conjunction with FIG. 2, there is no need for the user to first move the documents 32 or the like already accommodated within the bag 31 so as to form a space which would enable accommodation of the information processing apparatus 11 within the bag 31 before actually inserting the information processing apparatus 11 into the bag 31. Therefore, it is possible for the user to very easily and smoothly insert the information processing apparatus 11 into the bag 31 using only one hand even if the documents 32 are already accommodated within the bag 31.

On the other hand, when the user wishes to lift the information processing apparatus 11 which is set up on a base similarly as in the case shown in FIG. 4, the user can easily insert his fingers within a gap formed between the base and the information processing apparatus 11 and positively get hold of the information processing apparatus 11 due to the provision of the sloping surface 16. Hence, it is extremely easy for the user to lift the information processing apparatus 11 from the base, even by use of only one hand.

In addition, the user cannot see an edge of the bottom surface 15 for a large range of the outer periphery of the information processing apparatus 11 in the perspective view, that is, by a normal viewing angle from above the information processing apparatus 11, when the sloping surface 16 is provided. Further, the thickness of the information processing apparatus 11 appears smaller than the actual thickness when the sloping surface 18 is provided. Consequently, the information processing apparatus 11 will appear to the user as if the thickness of the information processing apparatus 11 is much smaller than the actual thickness, thereby making it possible to emphasize the thin shape of the information processing apparatus 11 to the user.

Therefore, the provision of the sloping surfaces 16 and 18 improves both the portability of the information processing apparatus 11 and the thin appearance of the information processing apparatus 11.

In addition, at least one of the sloping surfaces 16 and 18 may be curved inwards or outwards, similarly to the first and second modifications of the first embodiment described above. Moreover, the shape of the sloping surface 16 may be the same as or may be different from the shape of the sloping surface 18.

Of course, the second embodiment may be similarly applied to information processing apparatuses other than the portable word processor, such as a lap-top computer.

Further, the present invention is not limited to these embodiments, but various variations and modifications may be made without departing from the scope of the present invention.

What is claimed is:

1. An information processing apparatus comprising:

a main body having an upper surface; and a display part which opens and closes with respect to said main body, said display part in a closed state being stacked on the upper surface of said main body and forming a generally flat parallelepiped shape together with said main body, said parallelepiped shape having a top surface, a bottom surface, and side surfaces forming an outer periphery of said parallelepiped shape, wherein said main body has a sloping surface at each of two corners provided on at least one of said side surfaces, and said main body has no sloping surface at other areas of said at least one side surface between said two corners having said sloping surfaces, and wherein each of said two corners has two sides extending from said corner, and each of said two sides has at least a sloping portion.

2. The information processing apparatus as claimed in claim 1, wherein a vertical height of said main body sloping surface, taken from the bottom surface to a position where the main body sloping surface and the side surface meet, is greater than ¼ a vertical distance between the bottom surface and the top surface, and less than a vertical distance between the bottom surface and the upper surface of said main body.

3. The information processing apparatus as claimed in claim 1, wherein an angle formed between a horizontal extension of the bottom surface and said main body sloping surface is in a range of 30° to 60°.

4. The information processing apparatus as claimed in claim 1, wherein said main body sloping surface has a shape selected from a group consisting of a linear shape, a concave shape and a convex shape.

5. The information processing apparatus as claimed in claim 1, wherein said display part has a sloping surface joining the top surface and at least one of the side surfaces.

6. The information processing apparatus as claimed in claim 5, wherein an angle formed between a horizontal extension of the top surface and the display part sloping surface is in a range of 30° to 60°.

7. The information processing apparatus as claimed in claim 5, wherein the display part sloping surface has a shape selected from a group consisting of a linear shape, a concave shape and a convex shape.

8. The information processing apparatus as claimed in claim 5, wherein the display part sloping surface is provided continuously along an entire outer periphery of the parallelepiped shape.

9. The information processing apparatus as claimed in claimed 5, wherein the display part sloping surface is provided with at least one discontinuity along the outer periphery of the parallelepiped shape.

10. The information processing apparatus as claimed in claim 7, wherein the main body sloping surface and the display part sloping surface have the same shape.

11. The information processing apparatus as claimed in claim 7, wherein the main body sloping surface and the display part sloping surface have different shapes.

12. The information processing apparatus as claimed in claim 1, wherein said main body has a rear part provided with a hinge, said display part opens and closes with respect to said main body about the hinge, and said main body sloping surface is provided at least on one of the side surfaces located at a front part of said main body opposite to the rear part.

* * * * *

UNITED STATES PATENT AND TRADEMARK OFFICE
CERTIFICATE OF CORRECTION

PATENT NO. : 6,310,663 B1
DATED : October 30, 2001
INVENTOR(S) : Katsuichi Goto et al.

It is certified that error appears in the above-identified patent and that said Letters Patent is hereby corrected as shown below:

<u>Title page,</u>
Item [56], FOREIGN PATENT DOCUMENTS, add:
-- 4-44025    04/14/1992    Japan
   5-224776    03/09/1993    Japan --

Signed and Sealed this

Fifth Day of March, 2002

*Attest:*

*Attesting Officer*

JAMES E. ROGAN
*Director of the United States Patent and Trademark Office*